Patented June 7, 1938

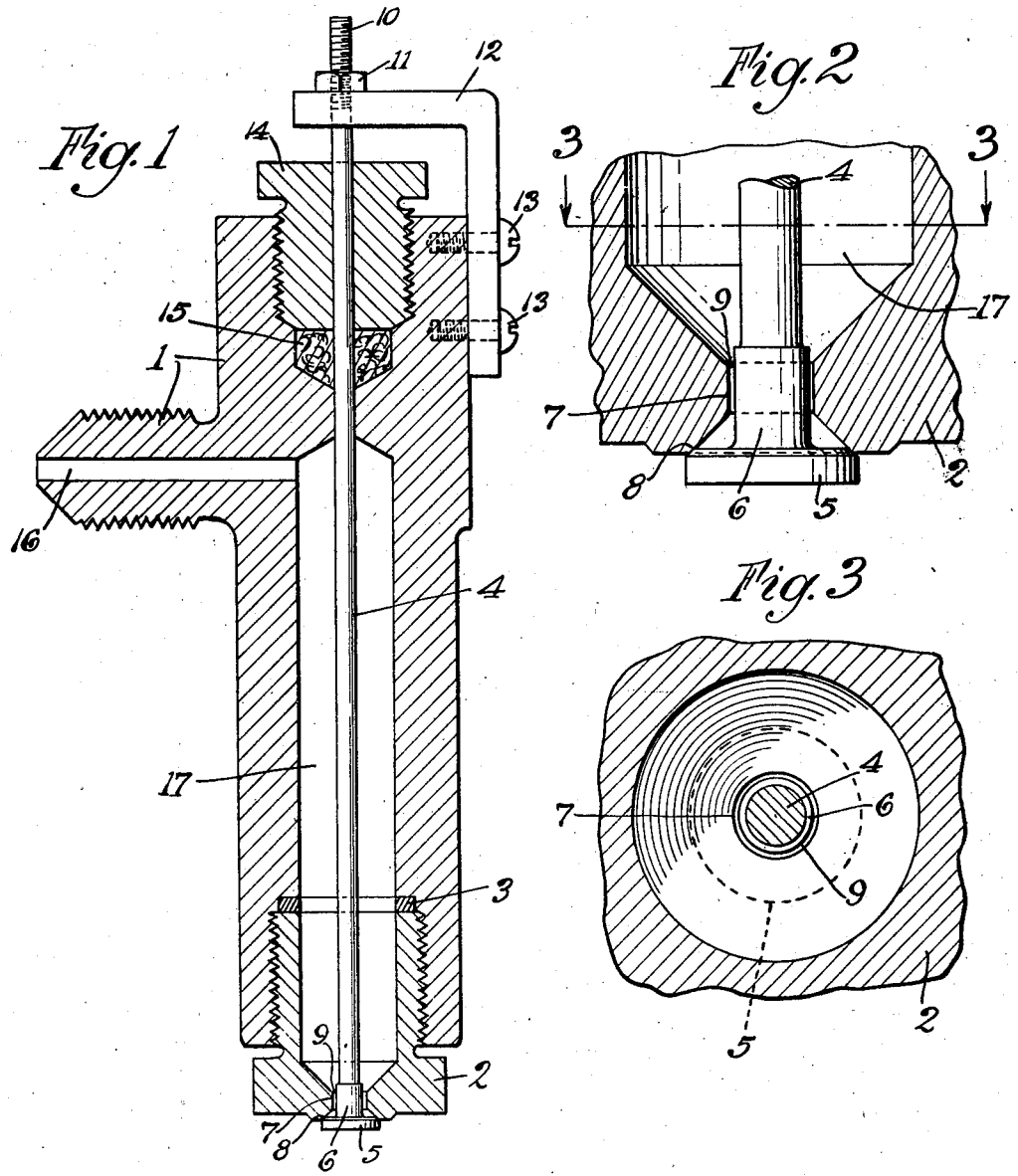

2,119,966

UNITED STATES PATENT OFFICE 2,119,966

ATOMIZING VALVE

Philip Lane Scott, Chicago, Ill., assignor to Super Diesel Tractor Corporation, La Porte, Ind., a corporation of New York Application August 7, 1935, Serial No. 35,109

12 Claims. (Cl. 299—107.3)

This invention relates to liquid atomizing valves and particularly to oil atomizing valves of the type used to atomize fuel in internal combustion engines. The improvement in the construction of such valves which constitutes my invention is in the means for centering the valve head with respect to the axis of the valve seat when the head is lifted from the seat. One object of the invention is to provide an automatic non-mechanical centering means in which the principle of fluid centering is involved.

Other objects will appear from time to time throughout the specification and claims.

The invention is illustrated more or less diagrammatically in the accompanying drawing wherein:

Figure 1 is a sectional view through the valve;

Figure 2 is an enlarged detail in section of the valve head and seat;

Figure 3 is a cross section of the head and seat construction taken on line 3—3 of Figure 2 just above the head and seat and at right angles to the axis.

Like parts are designated by like characters throughout the specifications and drawing.

In Figure 1, I is a valve body into which is screwthreaded a hardened seat plug 2 sealed against pressure by means of the gasket 3. 4 is a valve stem terminating in a valve head 5, immediately behind which, on the upstream side, is an enlargement 6 which tends to fill the throat 7 which lies immediately behind the seat 8, thereby forming a throttling and centering passageway 9. The valve stem 4 is screwthreaded at its upper end 10 to provide in cooperation with the nut 11 an adjusting means. The nut 11 bears upon a support 12 which is attached to the body 1 by means of the screws 13, 13. 14 is a gland nut screwthreaded in the body 1 and surrounding the stem 4 which, in cooperation with packing 15 forms an oil tight seal. 16 is the oil or liquid inlet passage leading into main liquid cavity 17 within the valve body 1.

In this particular type of construction a specific type of valve spring is used. This spring is a wire which stretches a minute amount when subjected to load caused by hydraulic pressure upon the valve head 5. It is of course obvious that a variety of other means might be used to hold the valve head upon its seat and this invention is not restricted to the particular construction shown.

In the case of the particular type of valve, namely an atomizing valve to atomize fuel upon its introduction into a combustion chamber in an internal combustion engine, and in the particular construction shown where the lifts are exceedingly small, this problem of centering the head when unseated presents unusual difficulties. It has been found commercially impractical with all present known methods to make a mechanical guide of this head which is sufficiently accurate. Uniformity of the spray is of the utmost importance in engine applications. The maximum power and the fuel consumption of the engine are directly affected by lack of uniformity in the cross section of the spray. Where valve lifts are of the order of a few ten-thousandths of an inch it is obvious that, with a mechanical guide, inaccuracy of the same number of 100 thousandths will produce a 20 per cent, not a 10 per cent, variation in the thickness of the oil film as it is passing through the atomizing orifice formed at the seat 8. The mere mechanical problem of producing such accuracies in a mechanical guide is clear. Distortion due to heat and wear quickly destroy the effectiveness of the most carefully made mechanical guide.

In some previous constructions employing fluid centering there has been a doubling up of functions which presented certain undesirable features. The atomization and the centering were accomplished at the same point, namely, at the seat itself. In general the narrower the seat the better the atomization but the narrower the seat the poorer the centering. Among other reasons for these conditions are the facts that the frictional resistance of a wide seat is an obvious loss of energy that should be used for the function of atomization, which among other things depends upon velocity, but on the other hand, the available area against which unbalanced forces in a liquid stream may operate to obtain centering is a direct measure of the actual available centering force. The novelty of this invention resides in separation of these two functions whereby a properly designed centering passage of large area may be provided as an entirely separate element from the atomizing orifice, an annulus in this case, permitting the use of a narrow seat at the atomizing orifice.

The use and operation of the invention are as follows:

The valve is assembled as shown and the valve head 5 is drawn down upon the seat 8 by means of the adjustment 10 and 11. Liquid is then introduced through the bore 16 by any suitable means, such as a reciprocating high pressure pump, which is not shown since its details in any specific construction form no necessary part of this invention. The liquid introduced under pressure exerts a force upon the valve head 5 stretching the stem 4 a minute amount permitting the head to rise off the seat. Discharge then takes place and an oil film is formed at the atomizing orifice created between the valve head and seat at the point 8. Atomization occurs at this point but practically no centering occurs here. The centering occurs in the annular throttling passageway 9, which, as can be seen, can be made of considerable length thereby obtaining suitable area against which the centering pressures may work.

It will be seen that in general this is nothing more than the application of the familiar principle of increasing velocities in a fluid stream at certain points whereby pressure changes occur which may be used in a variety of ways. What happens beyond the throttling passage has no important bearing on what happens in the passage and what happens in the passage is not materially affected by what happens beyond the passage.

It has been found practical that the clearances in such passages may be some thousandths of an inch and that the concentricity of the head with the enlargement 9 may vary within common commercial tolerances without effecting appreciably the centering since the clearance in the throttling passage is relatively much larger.

I claim:

1. In a liquid valve, a valve body, an inlet passageway, a valve seat in the body, a valve head adapted to coact with the seat, a flexible unguided valve stem attached to and supporting said valve head, said stem being free to move laterally for guiding by the hydraulic centering forces, means for positioning the valve head axially, and means for hydraulically centering the valve head radially with respect to the seat, said last means comprising a throttling passage lying upstream of the head and the seat.

2. In a liquid valve, a valve body, a valve seat, a valve head adapted to co-operate with said seat, a mechanically unguided stem carrying said head, said stem being free to move laterally for centering under the influence of hydraulic forces a restriction upstream of said seat, forming with said stem a centering passage, whereby liquid centering of said stem and said head is obtained with respect to the seat.

3. The method of centering a valve head and attached stem with respect to a valve seat when the head is lifted from the seat, which comprises passing fluid through the valve body, up to and through a greatly restricted channel about said stem, and lastly between the valve head and the seat.

4. The method of centering a valve head and attached stem with respect to a valve seat, which consists in passing fluid at high velocity through the valve body, suddenly increasing the velocity of fluid flow through a restricted channel about said stem, and finally discharging it between the head and the seat.

5. The method of centering a valve head and attached stem with respect to a valve seat, which consists in passing fluid through the valve body, suddenly increasing the velocity of fluid flow through a restricted zone about said stem, and finally discharging it between the head and the seat.

6. A fluid valve comprising a hollow body, an inlet opening, a discharge opening, a valve seat adjacent said opening, a valve head adapted to co-operate with said seat to close the valve and to form, with it, an atomizing orifice when the valve is open, mechanically unguided means including a flexible valve stem attached to said valve head for retaining the valve head on its seat, and for moving it with respect to the valve body, comprising a member lying within the valve body, a restriction in the valve bore upstream of the valve seat, said restriction providing a fluid centering zone about the valve retaining member.

7. A fluid valve comprising a hollow body, an inlet opening, a discharge opening, a valve seat, a valve head adapted to co-operate with said seat to close the valve, means for retaining the valve head on its seat, and for moving it with respect to the valve body, comprising a flexible stem member lying within the valve body, said member being mechanically unguided adjacent the valve seat and adapted to move laterally to be centered by hydraulic forces, a restriction in the valve bore adjacent and upstream of the valve seat, said restriction providing a fluid centering zone about the valve retaining member.

8. In combination in a valve, a valve body having a bore, an inlet and outlet to said bore, a valve seat adjacent said outlet, an unguided flexible valve stem positioned within said body and adapted for lateral movement in response to hydraulic forces, a head carried by said stem adapted to co-operate with said seat to close the outlet, and means for centering the valve when the valve is raised from its seat, said means comprising a restriction within the valve body about the stem, upstream of the valve seat.

9. In combination in a valve, a valve body having a bore, an inlet and outlet to said bore, a valve seat adjacent said outlet, an unguided valve stem positioned within said body and adapted for lateral movement in response to hydraulic forces, a head carried by said stem adapted to co-operate with said seat to close the outlet, and means for centering the valve when the valve is raised from its seat, said means comprising a restriction within the valve body about the stem and an enlargement on said stem, upstream of the valve seat, said restriction comprising the narrowest diameter of the valve bore.

10. In an atomizing valve, a body holding an orifice forming member, a second orifice forming member adapted to co-operate with said first member, means within said body for supporting and for positioning said second member axially, said last mentioned means comprising a support movably carrying said second orifice forming member for lateral centering movement in response to hydraulic forces, and additional means for positioning said second member radially with respect to the first member, said additional means including a centering passage upstream of the atomizing orifice, whereby atomization occurs largely at the atomizing orifice and liquid centering occurs largely in the centering passage.

11. In an atomizing valve, a hollow housing, an inlet orifice thereto, a discharge orifice therefrom, a seat adjacent said discharge orifice, a valve head adapted to close said seat, a freely flexible stem mounted in said valve housing, attached to said head, and secured at a point separate from said head, said stem being free from mechanical guiding adjacent said seat, and hydraulic means for centering said stem radially, said centering means comprising a throttling passage adjacent said discharge orifice and lying upstream from said orifice, said throttling passage adapted to remain open during atomization.

12. In a liquid atomizing valve, a hollow valve housing, a valve seat formed therein, and a mechanically unguided valve head, cooperating to form an atomizing orifice when the head moves off the seat, a mechanically unguided stem attached to said head, a wall of said housing proceeding up-stream from said seat and closely surrounding a portion of said stem, there being a minute clearance between stem and wall to raise the velocity of liquid passing therethrough greatly with respect to velocities upstream of the clearance, said raised velocity causing liquid centering of the stem with respect to the wall.

PHILI